Aug. 2, 1966   S. R. ARNOLD   3,264,563
TEST APPARATUS FOR DISPLAYING A SELECTIVELY SUPPRESSED
CURRENT-VOLTAGE CHARACTERISTIC OF
A SEMICONDUCTOR JUNCTION
Filed March 20, 1963
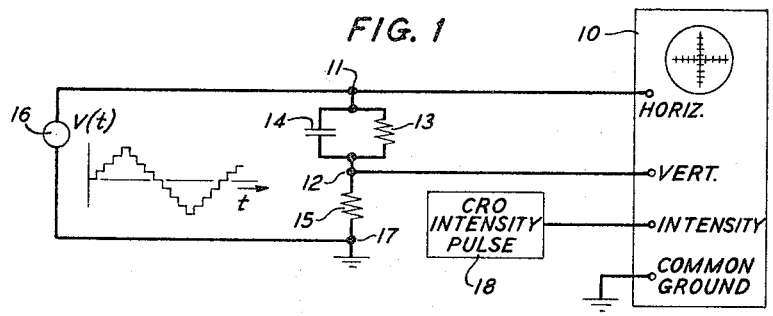
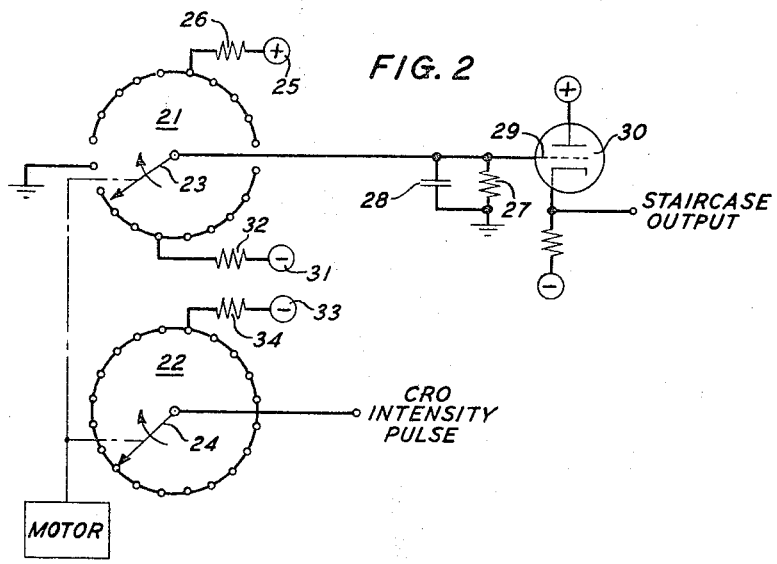
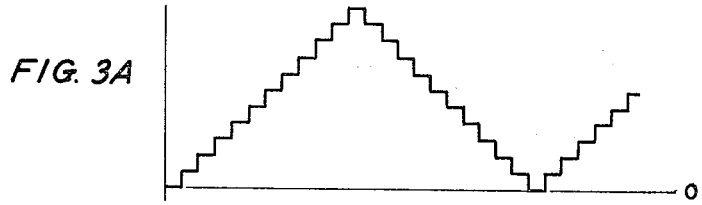
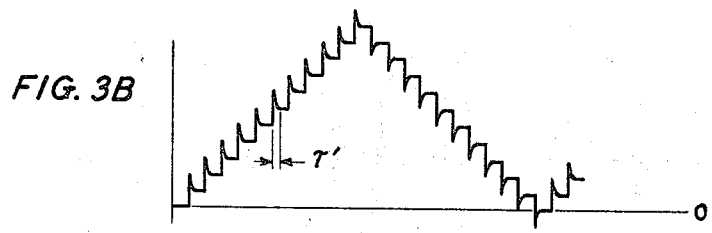
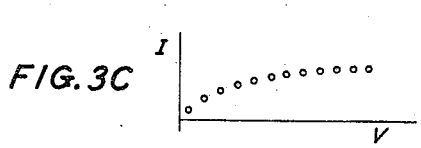
INVENTOR
S. R. ARNOLD
BY
ATTORNEY

3,264,563
TEST APPARATUS FOR DISPLAYING A SELECTIVELY SUPPRESSED CURRENT - VOLTAGE CHARACTERISTIC OF A SEMICONDUCTOR JUNCTION
Stephen R. Arnold, Plainfield, N.J., assignor to Bell Telephone Laboratories, Incorporated, New York, N.Y., a corporation of New York
Filed Mar. 20, 1963, Ser. No. 266,583
4 Claims. (Cl. 324—158)

This invention relates to circuitry for measuring the reverse current-voltage characteristic of a semiconductor junction and more particularly to circuitry for rapidly displaying the reverse current-voltage characteristics of semiconductor diodes and transistor junctions.

Conventional circuits for displaying the reverse current-voltage characteristics of semiconductor junctions on an oscilloscope have the advantage of speed and direct portrayal of the device behavior, but suffer in the display of the reverse characteristics from sensitivity limitations directly ascribable to capacitance effects in the device and in the leads attached to it. In conventional practice a sinusoidal waveform is applied across the junction in series with a current-sensing resistor. The vertical deflection terminals of the oscilloscope are then connected across the current-sensing resistor so that current is displayed vertically on the face of the oscilloscope. The horizontal deflection terminals of the oscilloscope are connected across the voltage source so that the voltage applied to the diode is displayed horizontally on the face of the oscilloscope. The resulting display should be a single line trace of the current-voltage characteristic of the junction but because of the small reverse bias current of the junction as compared with the current flowing through the capacitance associated with the junction the reverse current-voltage display becomes a loop. This result is due to the fact that current passing through the capacitance causes the total current passing through the current-sensing resistor connected in series with the diode to be approximately 65 degrees out of phase with the input voltage. While direct-current measuring techniques avoid the above difficulties they are usually very tedious and time consuming.

It is an object of this invention to overcome the capacitance limitations of conventional oscilloscope portrayal.

It is a related object of this invention to permit a high level of sensitivity in the display of the reverse current-voltage characteristic of a semiconductor junction.

It is a further object of this invention to avoid the necessity of making time consuming and tedious direct-current measurements.

In accordance with this invention the reverse current-voltage characteristic of a semiconductor junction is displayed on an oscilloscope by applying a staircase voltage waveform across a series circuit comprising the junction under test and a current-sensing resistor and suppressing the oscilloscope display during the presence of transient currents. One axis of the oscilloscope display is driven by the voltage across the sensing resistor and the other axis of the oscilloscope display by the input voltage, with the oscilloscope display suppressed during the transient current occurring at each vertical portion of the staircase voltage so that transient currents due to the capacitance associated with the diode and stray circuit capacitance are not displayed. The result is that the reverse-current characteristic is displayed as a series of closely spaced accurately positioned dots with no loop due to capacitance effects being present.

The invention will be more fully comprehended from the following detailed description taken in conjunction with the drawings, in which:

FIG. 1 shows a semiconductor junction test circuit embodying this invention;

FIG. 2 shows the voltage sources illustrated in block diagram form in FIG. 1;

FIG. 3A shows the voltage waveform applied to the semiconductor junction under test;

FIG. 3B shows the current flowing through the semiconductor junction in response to the applied voltage waveform; and FIG. 3C shows the resulting display of the reverse current-voltage characteristic of the diode.

A semiconductor junction, whose characteristic is to be displayed on an oscilloscope 10 is connected between test points 11 and 12 as shown in FIG. 1. The junction is represented, as is well known, by the parallel combination of a resistor 13 and capacitor 14. In series with the junction is a current-sensing resistor 15 and the series combination of the junction under test and the resistor 15 are connected across a source 16 of a staircase voltage waveform. The common junction 17 of one terminal of source 16 and resistor 15 is connected to ground as is the common ground connection of the oscilloscope. The horizontal deflection terminal of the oscilloscope is connected to test point 11 so that the output voltage or source 16 is displayed on the horizontal axis of the oscilloscope. The vertical deflection terminal of the oscilloscope is connected to test point 12 and as a result the voltage across current-sensing resistor 15 is displayed on the vertical axis of the oscilloscope. Since this voltage is directly proportional to the current through the diode, current is displayed vertically on the face of the oscilloscope. It is to be understood, of course, that the current could be displayed on the horizontal axis and the voltage on the vertical axis. The display on the face of the oscilloscope is normally adjusted by setting the oscilloscope intensity control so that no display is visible unless a pulse is applied to the intensity input terminal of the oscilloscope by a source 18.

To illustrate the theory of operation of this invention consider a semiconductor diode having a reverse voltage rating in excess of 100 volts as the semiconductor junction under test. The reverse current of such a diode is normally in the area of approximately $10^{-6}$ amperes at 250 volts reverse bias, and such a diode and its lead wires have a capacitance associated with them which is of the order of 30 micromicrofarads. A typical oscilloscope has a vertical sensitivity of the order of $10^{-3}$ volts/centimeter and in order to provide a vertical display of the reverse current-voltage characteristic one centimeter in height a current-sensing resistor 15 of resistance value $$R_{15} = \frac{10^{-3}v}{10^{-6}a} = 10^3 \Omega$$

is required for the diode whose resistance $R_{13}$ is $$R_{13} = \frac{250v}{10^{-6}a} = 2.5 \times 10^8 \Omega$$

In the conventional circuits where a 60-cycle sine wave is applied to the diode the capacitive reactance, $Xc$, of the capacitance 14 is $$Xc = \frac{1}{WC} = \frac{1}{377 \times 30 \times 10^{-12}} \approx 10^8 \Omega$$

and since the resistance, $R_{13}$, of resistor 13 is two and one half times the capacitive reactance, $X_c$, of capacitor 14 the current flowing through current-sensing resistor 15 is approximately 65 degrees of phase with the 60-cycle sine wave. This produces a severe and erroneous loop in the displayed characteristic and renders the display inaccurate.

In accordance with this invention this undesirable loop is eliminated. A staircase voltage shown in FIG. 3A is employed as described above and the resulting current through the diode is shown in FIG. 3B. A single trace of the reverse current-voltage characteristic will result if the display is rendered invisible during each transient time, $\tau^1$, shown in FIG. 3B, after each increase in voltage. The frequency of the staircase voltage is, for purposes of this illustration, twenty cycles/second with twenty five steps up and twenty five steps down. By elementary mathematics $\tau^1$, the duration of each transient current is $$\tau^1 = \frac{R_{13} R_{15}}{R_{13} + R_{15}} C_{14}$$

and since $R_{15} \ll R_{13}$ $$\tau^1 = R_{15} \times C_{14} = 10^5 \times 30 \times 10^{-12} = 3 \times 10^{-6} \text{ sec.}$$

where the resistance of resistor 15, $R_{15}$, is assumed to be $10^5$ ohms in order to examine an extreme case.

Although the time constant of this network is relatively short as shown above, the initial amplitude of the transient current may be quite high because the impedance of the capacitance 14 is, in response to each step increase or decrease in voltage, essentially zero. Thus although the time constant of the transient may be measured in only a few microseconds many lifetimes must pass before steady state behavior is reached. To determine the minimum blanking time required to render the transient current invisible consider an extreme case where each step of voltage is 10 volts, $R_{15} = 10^5 \Omega$, and $R_{13} = 10^9 \Omega$. The transient component of the response to the step voltage is $$i_T = \frac{10v}{10^5} e^{-t/\tau'}$$

where $\tau'$ is the time constant.
The steady state current is $$i_{ss} = \frac{V_p}{R_{13} + R_{15}}$$

$$i_{ss} = \frac{10}{10^9 + 10^5}$$

$$i_{ss} = 10^{-8} \text{ amp.}$$

To insure that the observed dots are accurately placed the transient current should be one hundredth the magnitude of the steady state current before an intensity pulse is applied to the oscilloscope to turn its display on.
Thus $$\frac{e^{-t/\tau'}}{10^5} = 10^{-2} \times i_{ss} = 10^{-10}$$

$$e^{-t/\tau'} = 10^{-10} \times 10^5 = 10^{-5}$$

$$e^{+t/\tau'} = 10^5$$

$$t/\tau' = 5 \times \ln 10 = 11.5$$

$$t = 11.5 \tau' = 11.5 \times 3 \times 10^{-6} = 34.5 \ \mu\text{sec.}$$

That is, the minimum blanking time is 34.5 $\mu$sec. Since the length of time of each step is $$\frac{1}{25} \times \frac{1}{40} \text{ sec.} = 10^{-3} \text{ sec.} = 10^3 \ \mu\text{sec.}$$

suppressing the oscilloscope display for a period of no more than 50 $\mu$sec. results in a negligible loss in signal trace brightness and serves to suppress the transient display. The reverse current-voltage characteristic of the diode is displayed as a single line trace of dots, as shown in FIG. 3C. All the dots are accurately positioned, and all loop effects due to stray capacitance and the capacitance associated with the diode are eliminated. The result is an accurate display of the reverse-current voltage characteristic.

The staircase voltage waveform shown in FIG. 3A, and the cathode ray oscilloscope intensity pulse to render the display visible, may be generated by using the mercury jet commutating switch described in United States Patent 2,782,273, issued to W. R. Davis et al. on February 19, 1957 and United States Patent 2,895,060, issued to C. G. Dorn on July 14, 1959. Two such switches 21 and 22, as shown in FIG. 2, are used with each switch having, for illustrative purposes, fifty contact pins. Switches 21 and 22, as described in the above-mentioned patents, have a stream or jet of liquid mercury which sweeps across the contact pins as would a conventional wiper arm in a simple mechanical commutator switch. For simplicity, the jets of mercury are shown as mechanical wipers 23 and 24 in the drawings of the switches 21 and 22, respectively.

Switch 21 and associated circuitry to be described, generates a staircase voltage waveform such as that shown in FIG. 3A. Twenty-five of the contacts, of which only a few are illustrated in FIG. 2, are connected to a source 25 of positive voltage by means of a resistor 26. The wiper arm 23 is connected to a resistance-capacitance network comprising a resistor 27 and a capacitor 28. As the wiper arm 23 sweeps across these twenty-five contact pins, positive voltage pulses are applied to the resistance-capacitance network. Each of the resulting voltage pulses raises the voltage across capacitor 28 so that when the last of these twenty-five contact pins is reached a positive going staircase voltage has been generated across capacitor 28. The capacitor is connected to the grid 29 of a vacuum tube 30 connected in the cathode follower configuration so that a high input impedance is provided for the voltage waveform so generated and a low output impedance is provided to the diode under test and the current-sensing resistor.

Twenty-four of the other twenty-five contact pins are connected to a source of negative voltage so that as the wiper arm 23 sweeps across the first twenty-four of these twenty-five contact pins the charge on capacitor 28 is removed and the voltage drops to ground. The fiftieth contact pin of the switch 21 is connected to ground to insure that after one revolution of the mercury jet 23 the staircase voltage is at ground potential.

For illustrative purposes only, consider the diode under test to have a reverse breakdown voltage in excess of 250 volts and the staircase voltage to be generated to have as its maximum voltage, 250 volts. In this illustrative embodiment the mercury switches are driven at 1200 revolutions per minute or 20 revolutions per second. As a result, using a 50-contact pin switch the duration of each step is $$\frac{1}{50} \times \frac{1}{20} \text{ sec.} = \frac{1}{1000} \text{ sec.} = 1000 \ \mu\text{sec.}$$

The switches are 25 percent duty cycle switches so each contact pin is actually contacted for a period of $$\frac{1}{4} \times 1000 \ \mu\text{sec.} = 250 \ \mu\text{sec.}$$

In order to insure that the capacitor 28 does not discharge during the period of time when no contact pin is in contact with wiper 23, the following values may be employed for the resistance of resistor 27 and the capacitance of capacitor 28

$$R_{27} = 10^7 \Omega$$

$$C_{28} = 1 \ \mu\text{fd.}$$

This gives a 10 sec. time constant to the resistance-capacitance network comprising resistor 26 and capacior 27.

Source 25 is, for example, a voltage source of 600 volts. To achieve a maximum voltage of 250 volts when the capacitor 28 has twenty-five voltage pulses applied to it, each pulse having a duration of 250 $\mu$sec. out of 1000

μsec., the resistance of resistor 26, $R_{26}$, is determined as follows:

$$q = I(250 \ \mu sec.) = C_{28}\delta v$$

$$I \approx \frac{600v}{R_{26}}$$

$$\therefore C_{28}\delta v = \frac{600}{R_{26}} \times 250 \times 10^{-6}$$

$$R_{26} = \frac{600 \times 250 \times 10^{-6}}{10^{-6} \times 10v} = 60 \times 250$$

$$= 150 \times 10^2$$

$$= 15000\Omega$$

Voltage source 31 discharges capacitor 28 and may have a value of 600−250=350 volts and employ a resistor 32 which has a resistance value of 15000Ω, the same value as that of resistor 26, since the voltage of source 31 and the voltage across the capacitor 28 aid each other to discharge the capacitor.

The above-described circuitry including the above-specified values of voltage and resistance may be employed where the maximum voltage of the staircase waveform is less than 250 volts. Resistor 27 can be a variable potentiometer with the tap of the potentiometer being connected to the grid 29 of tube 30. In this manner the maximum voltage of the staircase waveform may be easily reduced. Where it is desired to display the current-voltage characteristic at voltages greater than 250 volts then the resistance values of resistors 26 and 32 must be determined as disclosed above.

Since the capacitor 28 is connected to a source of voltage 25 or 31 for 250 μsec. out of every 1000 μsec., during these periods of connection its voltage rises or falls exponentially. Thus, the oscilloscope display must be turned off during this interval of time as well as during the transient decay time which follows. The total transient time may be shown mathematically to be slightly over 300 μsec., and this may be seen intuitively by adding the 250 μsec. charge time to the 50 μsec. minimum blanking time determined above.

To suppress the oscilloscope display for a minimum period of 300 μsec. after each contact pin of switch 21 is contacted, an identical switch 22 driven by the same motor as that which drives switch 21 is employed. The switch 22 is physically rotated $$\frac{1}{(2)(50)} \frac{36.0}{} = \frac{7.2°}{2} = 3.6°$$

in a clockwise direction such that each contact pin of switch 22 is contacted 500 μsec. after a contact pin of switch 21 is contacted. All fifty contact pins of switch 22 and connected to a source of positive voltage 32 by means of a resistor 34. The wiper 24 of the switch is connected to the intensity terminal of oscilloscope 10 so that for each period of 250 μsec. beginning 500 μsec. after a contact pin of switch 21 is contacted, the scope display is rendered visible by the positive pulse at wiper arm 24.

The resulting display shown in FIG. 3C is a series of dots which are generated as the staircase voltage rises and which are generated again as the staircase voltage drops. The resulting trace of dots has no spurious loop associated with it and the resulting twenty cycles/second display of dots is relatively free of flicker. All capacitance effects which previously created a spurious loop are eliminated.

Thus in accordaance with this invention the reverse current-voltage characteristic of a semiconductor junction is accurately and instantaneously displayed. The test sets embodying this invention avoid the tedious and time consuming process of direct-current testing while possessing all the advantages of the same.

It is to be understood that the above-described arrangements are merely illustrative of the application of the principles of the invention. Numerous other arrangements may be devised by those skilled in the art without departing from the spirit and scope of the invention.

What is claimed is:

1. A circuit for displaying on the screen of an oscilloscope the reverse current-voltage characteristic of a semiconductor junction under test comprising, in combination, an oscilloscope whose display is suppressed having a pair of horizontal and a pair of vertical deflection terminals, and a pair of intensity terminals to which the application of a pulse causes said oscilloscope display to become visible, a source of a staircase voltage, a current-sensing resistor connected in a series circuit with the junction under test across said source of staircase voltage, means connecting said horizontal deflection terminals across said source of voltage and said pair of vertical deflection terminals across said current-sensing resistor, and a source of pulses occurring a predetermined time interval after the occurrence of each step increase or decrease in said staircase voltage and connected to said intensity terminals of said oscilloscope to render said oscilloscope display visible after the decay of the transient current generated in response to each increase or decrease in said staircase voltage.

2. A circuit for displaying on the screen of an oscilloscope the reverse current-voltage characteristic of a semiconductor junction under test comprising, in combination, an oscilloscope whose display is suppressed having a pair of horizontal and a pair of vertical deflection terminals and a pair of intensity terminals to which the application of a pulse causes said oscillosocope display to become visible, a source of a staircase voltage, a current-sensing resistor connected in a series circuit with the junction under test across said source of staircase voltage, means connecting one of the pairs of deflection terminals across said source of voltage, means connecting the other of the pairs of deflection terminals across said current-sensing resistor, and a source of pulses occurring a predetermined time interval after the occurrence of each step increase or decrease in said staircase voltage and connected to said intensity terminals of said oscilloscope to render said oscilloscope display visible after the decay of the transient current generated in response to each increase or decrease in said staircase voltage.

3. A circuit for displaying on the screen of an oscilloscope the reverse current-voltage characteristic of a semiconductor junction under test comprising, in combination, an oscilloscope whose display is suppressed having a pair of horizontal and a pair of vertical deflection terminals, and a pair of intensity terminals to which the application of a pulse causes said oscilloscope display to become visible, a source of a staircase voltage comprising a motor driven mercury jet commutator switch having $n$ contact pins, a source of positive voltage connected to a first $n/2$ of said $n$ contact pins, a source of negative voltage connected to at least $n/2-1$ of a second $n/2$ of said $n$ contact pins, a resistor and a capacitor connected in parallel the combination being connected to the mercury jet of said switch, a cathode follower circuit whose input terminal is connected to said mercury jet, and a pair of output terminals for said source of staircase voltage connected across the cathode resistor of said cathode follower circuit, a current-sensing resistor connected in a series circuit with the junction under test across said output terminals of said source of staircase voltage, means connecting one pair of said deflection terminals across the output terminals of said staircase voltage source and the other pair of deflection terminals across said current-sensing resistor, and a source of pulses occurring a predetermined time interval after the occurrence of each step increase or decrease in said staircase voltage and connected to said intensity terminals of said oscilloscope to render said oscilloscope display visible after the decay of the transient current generated in response to each increase or decrease in said staircase voltage.

4. Apparatus in accordance with claim 3 wherein said source of pulses to render said oscilloscope display visible comprises a second mercury jet commutator switch having $n$ contact pins driven by the same motor as said first switch, but radially displaced from said first switch by a predetermined number of degrees, and a source of positive voltage connected to all of said contact pins.

No references cited.

WALTER L. CARLSON, *Primary Examiner.*

E. L. STOLARUN, *Assistant Examiner.*